(12) United States Patent
Yang (10) Patent No.: US 9,602,593 B2
(45) Date of Patent: Mar. 21, 2017

(54) LOAD SWITCH COMMAND INCLUDING IDENTIFICATION OF SOURCE SERVER CLUSTER AND TARGET SERVER CLUSTER

(71) Applicant: Hangzhou H3C Technologies Co., Ltd., Hangzhou (CN)

(72) Inventor: Qi Yang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/895,186

(22) PCT Filed: Jun. 6, 2014

(86) PCT No.: PCT/CN2014/079422
§ 371 (c)(1),
(2) Date: Dec. 1, 2015

(87) PCT Pub. No.: WO2014/198202
PCT Pub. Date: Dec. 18, 2014

(65) Prior Publication Data
US 2016/0112503 A1    Apr. 21, 2016

(30) Foreign Application Priority Data
Jun. 9, 2013   (CN) .......................... 2013 1 0231992

(51) Int. Cl.
*H04L 29/08* (2006.01)
*H04L 12/64* (2006.01)
(Continued)

(52) U.S. Cl.
CPC ...... *H04L 67/1008* (2013.01); *H04L 12/6418* (2013.01); *H04L 43/16* (2013.01); *H04L 49/50* (2013.01); *H04L 67/28* (2013.01)

(58) Field of Classification Search
CPC ..... H04L 67/1002; H04L 45/38; H04L 45/70; H04L 47/32; H04L 67/1008; H04L 67/1036; G06F 9/505; G06F 9/5083
See application file for complete search history.

(56) References Cited

U.S. PATENT DOCUMENTS

2005/0027862 A1*  2/2005  Nguyen ................. G06F 9/505
                                                                709/225
2005/0055435 A1*  3/2005  Gbadegesin ........... H04L 29/06
                                                                709/224
(Continued)

FOREIGN PATENT DOCUMENTS

CN    102170474    8/2011
CN    102437960    5/2012

OTHER PUBLICATIONS

International Search Report and Written Opinion dated Sep. 12, 2014, PCT Patent Application No. PCT/CN2014/079422 dated Jun. 6, 2014, ISA/CN.

(Continued)

*Primary Examiner* — Backhean Tiv
(74) *Attorney, Agent, or Firm* — Hewlett Packard Enterprise Patent Department (57) ABSTRACT

A software defined network (SDN) controller sends a load switch command to a network device. The load switch command includes identification of a source server cluster and identification of a target server cluster.

8 Claims, 6 Drawing Sheets

(51) Int. Cl.
*H04L 12/26* (2006.01)
*H04L 12/931* (2013.01)

(56) References Cited

U.S. PATENT DOCUMENTS

| | | | |
|---|---|---|---|
| 2011/0145390 A1* | 6/2011 | Kakadia | G06F 9/505 709/224 |
| 2011/0314119 A1* | 12/2011 | Kakadia | H04L 29/12066 709/213 |
| 2012/0023231 A1 | 1/2012 | Ueno | |
| 2012/0166630 A1* | 6/2012 | Cho | G06F 9/5083 709/224 |
| 2012/0271964 A1* | 10/2012 | Porter | H04L 67/1008 709/235 |
| 2012/0300615 A1 | 11/2012 | Kempf et al. | |
| 2013/0028091 A1* | 1/2013 | Sun | G06F 9/5083 370/236 |
| 2013/0044636 A1* | 2/2013 | Koponen | H04L 47/12 370/254 |
| 2013/0054806 A1* | 2/2013 | Francis | H04L 67/1002 709/226 |
| 2013/0121207 A1 | 5/2013 | Parker | |
| 2013/0188489 A1* | 7/2013 | Sato | H04L 49/555 370/235 |
| 2013/0268646 A1* | 10/2013 | Doron | H04L 67/1002 709/223 |
| 2013/0322460 A1* | 12/2013 | DeCusatis | H04L 45/24 370/419 |
| 2014/0067983 A1* | 3/2014 | Gabriel | G06F 11/2005 709/208 |
| 2014/0280817 A1* | 9/2014 | Uppalapati | H04L 41/044 709/223 |
| 2015/0327135 A1* | 11/2015 | Luo | H04W 36/08 370/238 |
| 2016/0042014 A1* | 2/2016 | Jalan | G06F 17/30289 707/610 |
| 2016/0043901 A1* | 2/2016 | Sankar | H04L 41/12 709/226 |
| 2016/0094449 A1* | 3/2016 | Ramia | H04L 45/021 370/392 |
| 2016/0112503 A1* | 4/2016 | Yang | H04L 12/6418 709/223 |

OTHER PUBLICATIONS

Uppal et al., "OpenFlow Based Load Balancing", University of Massachusetts Amherst, Jun. 5, 2010.

* cited by examiner

LOAD SWITCH COMMAND INCLUDING IDENTIFICATION OF SOURCE SERVER CLUSTER AND TARGET SERVER CLUSTER

CLAIM FOR PRIORITY

The present application is a national stage filing under 35 U.S.C. §371 of PCT application number PCT/CN2014/079422, having an international filing date of Jun. 6, 2014, which claims priority to Chinese patent application number 201310231992.4, having a filing date of Jun. 9, 2013, the disclosures of which are hereby incorporated by reference in their entireties.

BACKGROUND

Enterprise data centers may provide services to users through a server cluster approach. A server cluster may include a plurality of physical servers or virtual servers to provide the same service, for example, such as web access service. A load balance device (LBD) is deployed at the front end of a cluster. According to a predetermined load balancing algorithm, the LBD may distribute access requests initiated from external hosts to different servers in a server cluster for further processing, and then the LBD sends responses returned from the servers to the external host.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1:
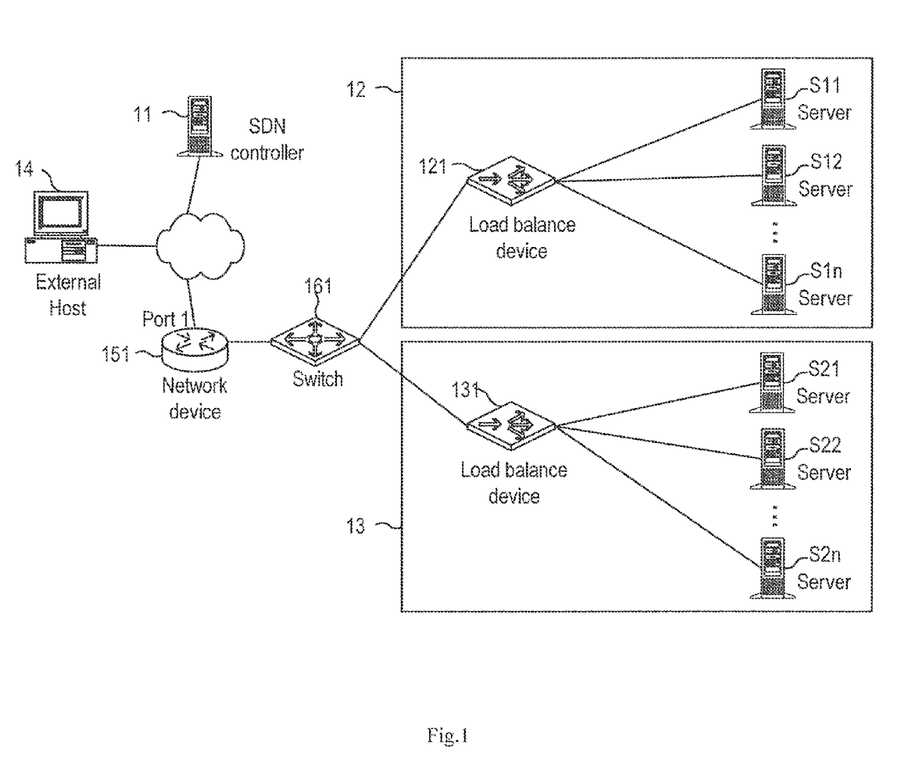
FIG. 1 is an example of a schematic of illustrating a software defined network (SDN)

In an example, load balancing across clusters is implemented under the control of a software defined network (SDN) controller. FIG. 1 is a schematic of illustrating part of a software defined networks (SDN) in one or more examples of the present disclosure. Referring to FIG. 1, in this example, the software defined network includes a SDN controller 11, a first server cluster 12, a second server cluster 13, an external host 14, a network device 151 and a switch 161. The first server cluster 12 includes a plurality of servers S11, S12 . . . S1n and a first load balance device (LBD) 121, and the second server cluster 13 includes a plurality of servers S21, S22 . . . S2n and a second LBD 131. The external host 14 sends access requests to the servers S11, S12 . . . S1n, S21, S22 . . . and S2n. The LBD 121 is responsible for calculating and balancing the loads of these servers in the first server cluster 12, and the LBD 131 is responsible for calculating and balancing the loads of these servers in the second server cluster 13. The packets of the access requests of the external host 14 will be sent to the corresponding servers for servicing through the network device 151, the switch 161 and the LBD 121, 131.

Figure 2:
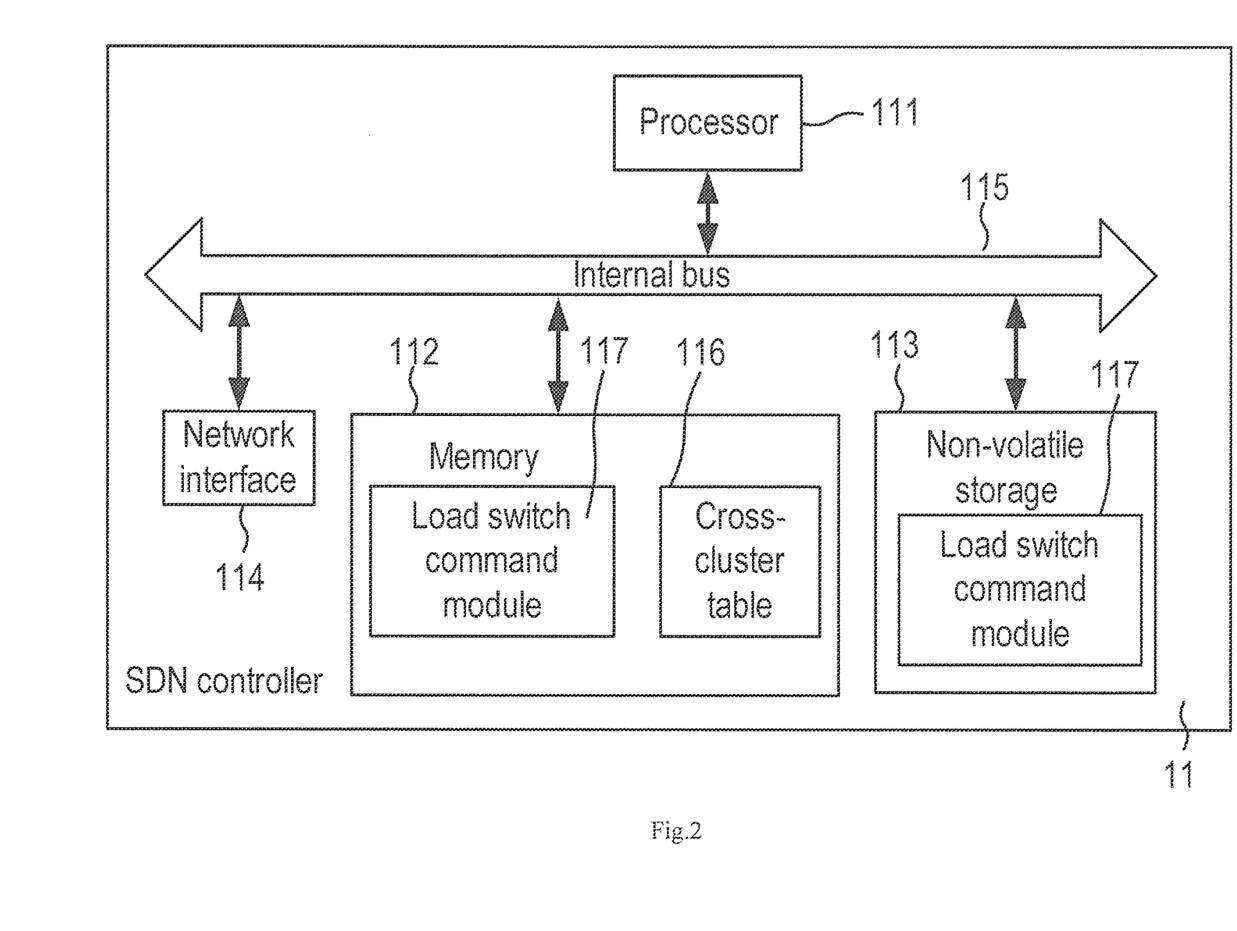
FIG. 2 is an example of a block diagram illustrating a SDN controller.

FIG. 2 is a block diagram illustrating a SDN controller 11 in an example of the present disclosure. As shown in FIG. 2, the SDN controller 11 includes a processor 111, a memory 112, a non-volatile storage 113 and a network interface 114. The memory 112, the non-volatile storage 113 and the network interface 114 are accessible by the processor through the internal bus 115. The non-volatile storage 113 stores modules of machine readable instructions executable by the processor 111 including a load switch command module 117. As explained in more detail later, the load switch command may cause a second server cluster to respond to an access request addressed to a first server cluster. i.e. it may transfer the logic of access across clusters. The non-volatile storage 113 in which the machine readable instructions are stored may be a non-volatile memory or storage media including by way of example semiconductor memory devices, e.g., EPROM, EEPROM, DRAM and flash memory devices; magnetic disks, e.g., internal hard disks or removable disks; magneto optical disks; and CD ROM and DVD-ROM disks. The memory 112 may be a volatile or non volatile memory, including by way of example semiconductor memory devices, e.g., EPROM, EEPROM, DRAM and flash memory devices etc. As shown in FIG. 2, the processor 111 of the SDN controller 11 reads a program which includes the switch command module 117 stored in the non-volatile storage 113 to memory 112 and executes the switch command. Both the memory 112 and the non-volatile storage 113 are examples of non-transitory computer readable storage media. The memory 112 may also store a cross-cluster table 116 which is described in more detail below.

Figure 3:
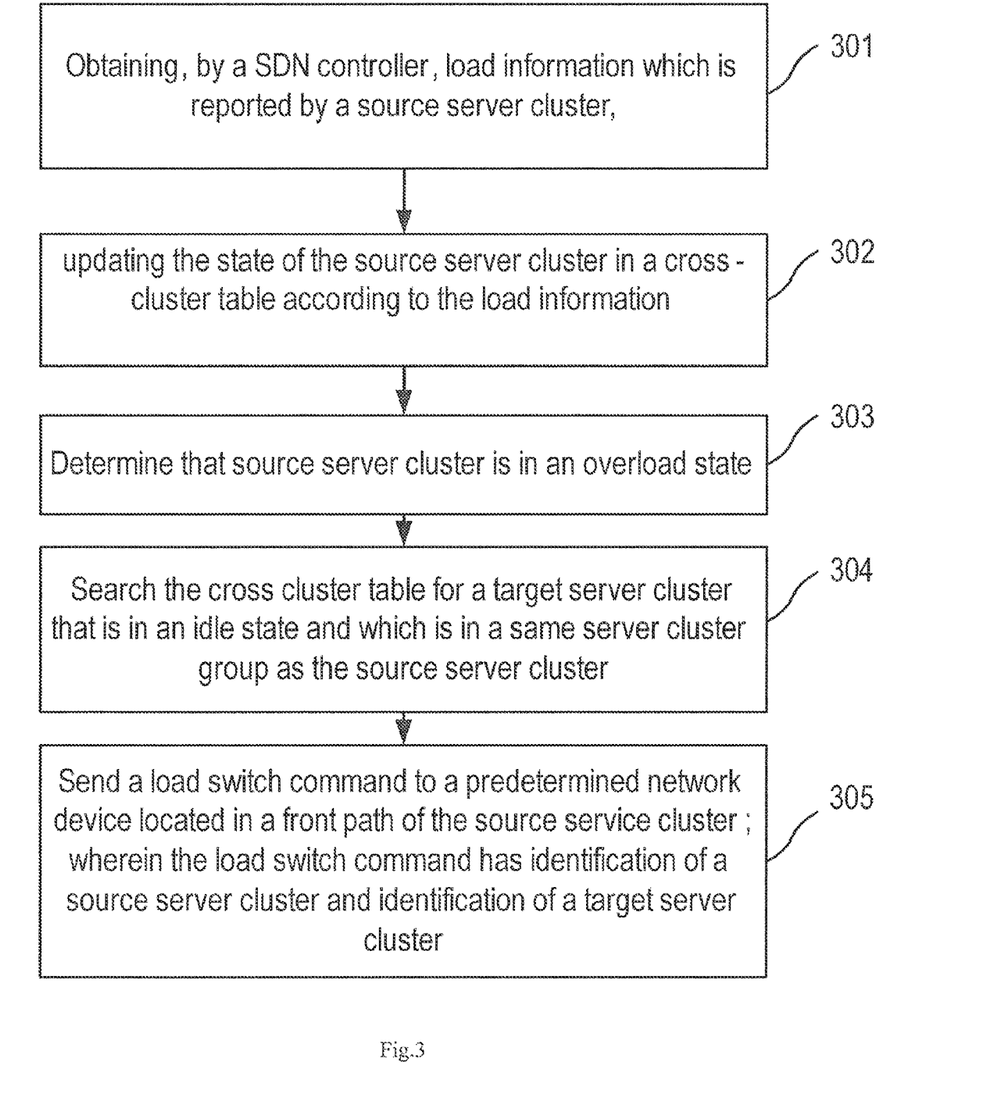
FIG. 3 is an example of a flowchart of load balancing across cluster.

FIG. 3 is a flowchart of a method for the SDN controller 11 which has completed load balancing across server clusters in an example of the present disclosure. As shown in FIG. 3, in block 301, the SDN controller 11 obtains load information which is reported by a source server cluster. In block 302, the SDN controller updates the state of the source server cluster in a cross-cluster table 116 in accordance with the load information. The cross-cluster table 116 may be stored in the memory 112. The storage of the cross-cluster table in the memory 112 may be temporary.

At block 303 the SDN controller 11 determines that the source server cluster is in an overload state.

At block 304, in response to determining that the source server cluster is in an overload state the SDN controller 11 searches the cross-cluster table to find a search target server cluster that is in an idle state and which is located in the same server cluster group as the source server cluster.

At block 305, the SDN controller 11 sends a load switch command to a predetermined network device which is located in a front path of the source server cluster, wherein the load switch command has identification of the source server cluster and identification of a target server cluster. The load switch command may be sent simultaneously with the searching of the cross-cluster table.

In an example, the target server clusters which belong to the same server cluster group as the source server cluster are as follows: the server clusters that are in idle state and can provide same service of the source server cluster to the external host. For example, as shown in FIG. 1, the first server cluster 12 and the second server cluster 13 belong to the same server cluster group X1. The front path is defined as: a path between a LBD of the source server cluster and an external host. The LBD may be considered as a starting point of the front path and an external host may be considered as an end point of the front path. The external host may initiate a session request with the source server cluster. For example, in FIG. 1, the front path is starting from the first LBD 121 to the external host 14. Any network device with corresponding processing capability in the front path can be designated as the predetermined network device. The predetermined network device, for example, can be the first LBD 121, or other network device such as the network device 151 or switch 161.

In the following example, the predetermined network device is a router, but in other examples it may for instance be a high-performance switch, or security equipment that is responsible for security etc, and is not limited to being a router. In the example of FIG. 1 the predetermined network device 151 is a router and as such the SDN controller 11 is shown as having a connection to the router 151. In other examples where another network device, such as LBD 121 or switch 161, is the predetermined network device, said another network device may have a direct or indirect connection path to the SDN controller.

In a SDN, the flow table entries are distributed by a SDN controller to a SDN switch or other network device, and the SDN switch can determine how to forward packets based on those flow table entries. In an example of the present disclosure, the interaction between the SDN controller and the LBD of a server cluster may be able to perform further functions relating to the load of a server cluster or which server cluster should be used. In an example, a LBD belongs to the server cluster and can send load information of the server cluster to a SDN controller. The SDN controller determines the state of the corresponding server cluster according to the load information which is uploaded by the LBD, and updates the corresponding records in the cross-cluster table. Table 1 is schematically shown the cross-cluster table in one or more examples of the present disclosure. In Table 1 the abbreviation SC stands for server cluster.

TABLE 1

| SC Group ID | SC ID | SC State |
|---|---|---|
| X1 | SC12 | idle |
|  | SC13 | idle |
| X2 | SC14 | idle |
|  | SC15 | idle |
|  | SC16 | idle |

The load information may for example be quantitative load size information, such as the number of sessions for characterizing the load size information. In another example, the load size information may be characterized by the share rate of the processor of a LBD or a server. In the following examples, the number of sessions will be described for illustrative purpose, but it is to be understood that other metrics may be used to indicate the load. In other examples the load information may be qualitative load state information such as state information indicating idle load or overload, rather than quantitative load size information.

In an example, assuming the first server cluster 12 is the source server cluster, the SDN controller 11 obtains the load information of the first server cluster 12 wherein the load information is uploaded by the first LBD 121, then the SDN controller 11 can determine whether the first server cluster 12 is in an overload state. The determination of the first server cluster 12 in the overload state by the SDN controller 11 is associated with the load information uploaded by the first LBD 121. When a new session is created, the session information is uploaded to the SDN controller 11 by the first LBD 121. When a session is deleted, the first LBD 121 also notifies the SDN controller to perform delete operation in synchronicity. Thus, the SDN controller 11 can timely keep a copy of the session list of the first server cluster 12 in which the first LBD 121 preserved, and can determine the number of current sessions of the first server cluster 12. On this basis, the SDN controller 11 may compare the number of current sessions of the first server cluster 12 with various predetermined thresholds to determine whether the first server cluster 12 is in the overload state.

For example, assuming that a switch threshold of the first LBD 121 is 10,000 sessions and a total switch threshold which is a summation of session processing capability of all the servers in the first server cluster is 15,000 sessions, then the whole bottleneck of the first server cluster 12 is limited to the processing capability of the first LBD 121. When the SDN controller 11 finds that the number of current sessions of the first server cluster 12 reaches 10,000 sessions, the SDN controller 11 can decide that the first server cluster 12 is in the overload state because the number of sessions of the first LBD 121 reaches to the switch threshold. In an another example, assuming that the processing capability bottleneck of the first LBD 121 is 10,000 sessions, the bandwidth bottleneck of the first LBD 121 is 8,000 Mbps, and each session occupies 1 Mbps, in fact, the SDN controller 11 can decide that the first LBD 121 is in bandwidth bottleneck when the number of sessions reaches 8,000. At this time, the SDN controller 11 can decide that the first server cluster 12 is in the overload state. In a further example, assuming that the first LBD has high performance processing capability, and the processing capability of each server in the first server cluster 12 is weak, for example, the summation of session processing capability of all of the servers in the first server cluster 12 is 7,000 sessions, then the servers in the first server cluster 12 will reach processing bottleneck first. Meanwhile, the SDN controller 11 can decide that the first server cluster 12 is in the overload state.

In the aforementioned examples, the first LBD 121 is responsible to upload the quantitative load information of the first server cluster 12 to the SDN controller 11. The SDN controller 11 determines whether the first server cluster 12 is in the overload state by calculation. In an another example, when the processing capacity of the first LBD 121 is strong, the first LBD 121 can calculate the load state information by itself, and then upload to the SDN controller 11. The first LBD 121 undertakes the calculation task of the SDN controller 11. In this case, the creation of a new session or the deletion of a session by the first LBD 121 is need not be uploaded to the SDN controller 11. Rather, when the first LBD 121 finds that the first server cluster 12 enters the overload state or exits from the overload state, the LBD 121 reports this change to the SDN controller 11. At this time, the first LBD 121 reports the qualitative load information characterizing the load state change of the first server cluster 12.

The SDN controller 11 is no longer necessary to calculate for determining the state of the server cluster.

Please refer to FIG. 3, when the SDN controller 11 determines that the first server cluster 12 enters to the overload state, the SDN controller 11 updates the record of the first server cluster 12 in the table 1. The state of the first server cluster 12 is changed from the idle state to the overload state, and the table 1 is updated as shown in the table 2. The SDN controller 11 searches the table 2 to find a search target server cluster that is an idle state which is located in the same server cluster group as the first server cluster 12. In this case, assuming it can find that the second server cluster 13 is in the idle state from looking the table 2 up. The SDN controller 11 designates the second server cluster 13 as a target server cluster to share the new access to the first server cluster 12.

TABLE 2

| SC Group ID | SC ID | SC state |
|---|---|---|
| X1 | SC12 | overload |
|  | SC13 | idle |
| X2 | SC14 | idle |
|  | SC15 | idle |
|  | SC16 | idle |

In the initialization process, the network administrator can assign the first server cluster 12 and the second server cluster 13 into the same server cluster group X1 because both provide the same services to external hosts, such as access to specific web services. Similarly, the network administrator can assign a server cluster 14, a server cluster 15 and a server cluster 16 into another server cluster group X2 because those offer the same service to external hosts, such as specific streaming media dispatch services (server clusters 14, 15 and 16 are shown in Table 2, but are not shown in FIG. 1).

Figure 4:
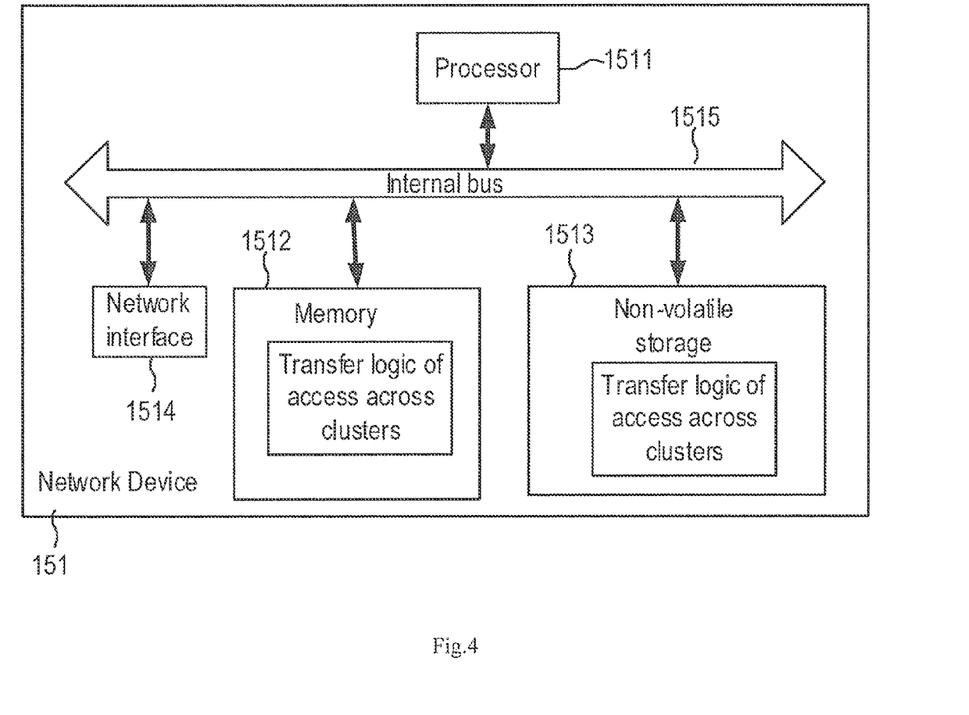
FIG. 4 is an example of a block diagram illustrating part of a network device.

After finding the second server cluster 13 which is in the idle state, the SDN controller sends load switch command to a predetermined network device which is located in a front path of the first server cluster 12. The predetermined network device can be any network device with corresponding processing capability located in the front path, wherein the front path is a segment path that is starting from the first LBD 121 to the external host 14. Thus, according to the different predetermined policy of the network administration, the predetermined network device can be the first LBD 121, or other network device such as the network device 151 or switch 161 etc. In an example, the SDN controller 11 sends load switch command to the network device 151 for requesting the network device 151 to transfer the new access of the first server cluster 12 to the second server cluster 13. Thus, it can avoid the load degeneration of the first server cluster 12. After receiving the load switch command which carries the identification of the first server cluster 12 and the second server cluster 13, the network device 151 can make sure that it needs to transfer the new access of the first server cluster 12 to the second server cluster 13. The network device 151 now performs a switch processing mode for the source server cluster. FIG. 4 is a block diagram illustrating a predetermined network device, such as a router in an example of the present disclosure.

Please refer to FIG. 4; the network device 151, which may for example be a router, switch or LBD etc, includes a processor 1511, a memory 1512, a non-volatile storage 1513 and a network interface 1514. The memory 1512, the non-volatile storage 1513 and the network interface 1514 are accessible by the processor through the internal bus 1515. The non-volatile storage 1513 stores modules of machine readable instructions executable by the processor 1511 including a load switch command module 1517. As explained in more detail later, the load switch command may cause a second server cluster to respond to an access request addressed to a first server cluster. I.e. it may transfer the logic of access across clusters. The non-volatile storage 1513 memory in which the machine readable instructions are stored may be a non-volatile memory or storage media including by way of example semiconductor memory devices, e.g., EPROM, EEPROM, DRAM and flash memory devices; magnetic disks, e.g., internal hard disks or removable disks; magneto optical disks; and CD ROM and DVD-ROM disks. The memory 112 may be a volatile or non volatile memory, including by way of example semiconductor memory devices, e.g., EPROM, EEPROM, DRAM and flash memory devices etc. As shown in FIG. 4, the processor 1511 of the network device 151 reads a program which includes the switch command module 1517 stored in the non-volatile storage 1513 to memory 1512 and executes the switch command module 1517. Both the memory 1512 and the non-volatile storage 1513 are examples of non-transitory computer readable storage media. The memory 1512 may also store a cross-cluster table 1516 which is described in more detail below.

Figure 5:
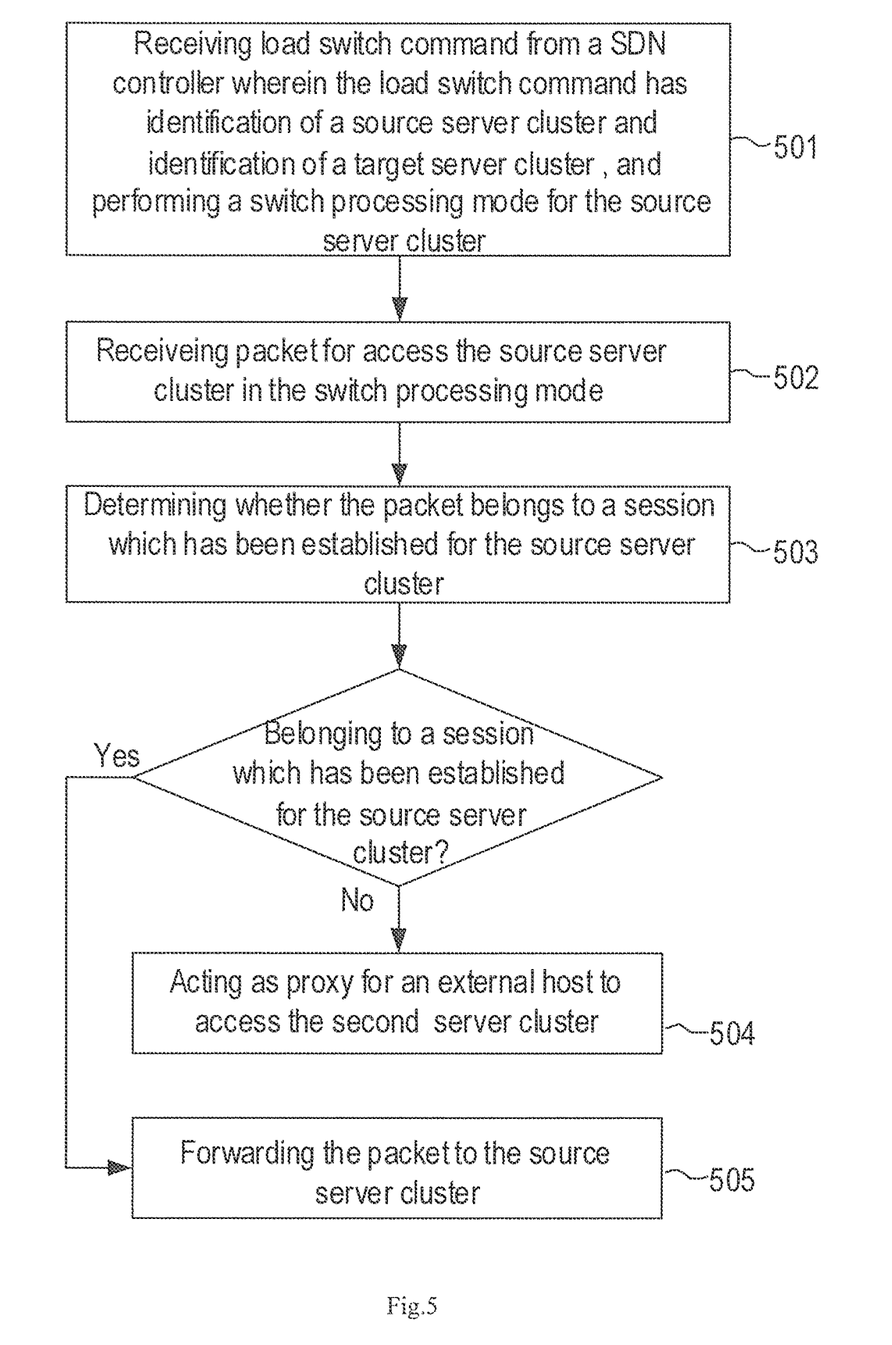
FIG. 5 is an example of a flowchart of load balancing across cluster in a network device of FIG. 4.

FIG. 5 is a flowchart of a method for load balancing across server clusters in a network device of FIG. 4 in an example of the present disclosure. As shown in FIG. 5, in block 501, the network device 151 receives the load switch command from a software defined networks (SDN) controller 11 wherein the load switch command has identification of a source server cluster and identification of a target server cluster, and performs a switch processing mode for the source server cluster. The network device 151 has at least two operation modes for a same server cluster. One operation mode is a switch processing mode and the other is a load switch-back mode. In different operation mode, the process of the network device 151 will be different. When the network device 151 receives the load switch command, the network device 151 performs the switch processing mode which includes the following operations.

In block 502, the network device 151 receives packet for accessing the source server cluster in the switch processing mode.

In block 503, the network device 151 determines whether the packet belongs to a session which has been established for the first server cluster 12, and if it determines the packet belongs to session which has been established for the first server cluster 12 (503—yes), then the network device 151 processes to block 505, otherwise, it processes to block 504.

In block 504, the network device 151 acts as proxy for an external host to access the second server cluster 13. That is, the network device 151 modifies the source IP address of a request packet from the external host and then forwards the modified request packet to a target server cluster.

In block 505, the network device 151 forwards the packet to the first server cluster 12.

More detailed examples are provided in the following for illustration. When the first server cluster 12 enters to the overload state, in order to maintain the consistency of the service, if the access packet from the external host 14 belongs to a session which has been established for the first server cluster, the packet still needs be sent to the first server cluster for processing. According to the session listed table which has been established for the first server cluster, the network device 151 can determine whether a packet is belonged to a session which is generated for a new access after the first server cluster 12 entering to the overload state. In this example, excepting for sending control command to the network device 151, the SDN controller 11 also transmits the session list table of the first server cluster 12 to the network device 151 in synchronicity, wherein the session list table is send from the first LBD 121. Please refer to the Table 3 for an example. In another example, if the SDN controller 11 already has a copy of the session list table in itself, the first LBD 121 does not need to send repeatedly.

TABLE 3

| SC ID | No. | SIP | DIP | SPort | DPort | Protocol Type |
|-------|-----|-----|-----|-------|-------|---------------|
| SC12 | 1 | 1.1.1.2 | 2.2.2.2 | 123 | 8080 | TCP |
| | 2 | 1.1.1.3 | 2.2.2.2 | 123 | 8080 | TCP |
| | 3 | 1.1.1.4 | 2.2.2.2 | 123 | 8080 | TCP |
| | ... | ... | ... | ... | ... | ... |
| | n | 1.1.121.2 | 2.2.2.2 | 123 | 8080 | TCP |

After the first server cluster 12 entering to the overload state, when an access request of the first server cluster 12 arrives at the router 151, the network device 151 can search the session list table of the first server cluster 12 based on the session characteristics of the request to query whether there is a matched record. If the query is hitting, it indicates that the packet belongs to an established session of the first server cluster 12. Then, the network device 151 can transparently forward the packet to the first LBD 121 in order to implement the access of the first server cluster 12. If the query is missing, it indicates that the packet belongs to a new session which is established after the first server cluster 12 entering to the overload state. The packet of the new session which is established after the first server cluster 12 entering to the overload state needs to be transferred to the second server cluster 13 for processing.

Please continue to refer to FIG. 1; the network device 151 will obviously forward the access packet of the second server cluster or other server cluster. Thus, the network device needs to filter out the packet which accesses the first server cluster from the all packets and the filtering method can be flexible. In an example, the network device 151 may first issue the access control list (ACL) classification rules of the packet to a corresponding external port such as Port 1 shown in FIG. 1. Thus, all the packets that access the first LBD 121 can be filter out. Of course, the interactions between the SDN controller 11 and the first LBD 121 are not necessary to filter out, so the ACL classification rules require reasonable defined. After packet filter being completed, the network device 151 can be used as proxy to achieve the transfer of access. In the present example, the network device 151 may modify the IP address and other necessary parameters of the original packet to act as proxy for the external host 14 to access the second LBD 131, and the network device 151 keeps the modification relationships in local.

After receiving the modified packets, the second LBD 131 based on predetermined processing rules will dispatch the access packets to the servers in the second server cluster 13 for processing. The server in the second server cluster 13 sends back a response packet to the second LBD 131 after finishing processing the access request. When the network device 151 receives the response packets from the second LBD 131, the network device 151 modifies the response packets in accordance with the preserved modification relationships, and then sends to the external host 14. Thus, the network device 151 completes the role of proxy for the external host 14, and the modification of the packets is transparent to the external host 14 and the second LBD 131.

When the first server cluster 12 enters to the overload state, the first LBD 121 can still periodically upload the load information. All the new access for the first server cluster 12 is been transferred to the second server cluster 13. At this time, the number of sessions of the first server cluster 12 will be decreasing rather than increasing. For example, when some external host does not need the service of the first server cluster 12, the external host will exit the session. The number of the original session of the first server cluster 12 will decrease which leads the first server cluster 12 to exit the overload state. In an example, the SDN controller 11 sends load switch-back command to the predetermined network device to cancel the transfer of new access when a switch-back threshold is met, wherein the value of the switch-back threshold is lower than that of the switch threshold. When the network device 151 receives the load switch-back command, the network device 151 performs the load switch-back mode for performing the normal functionalities of the network device 151.

Figure 6:
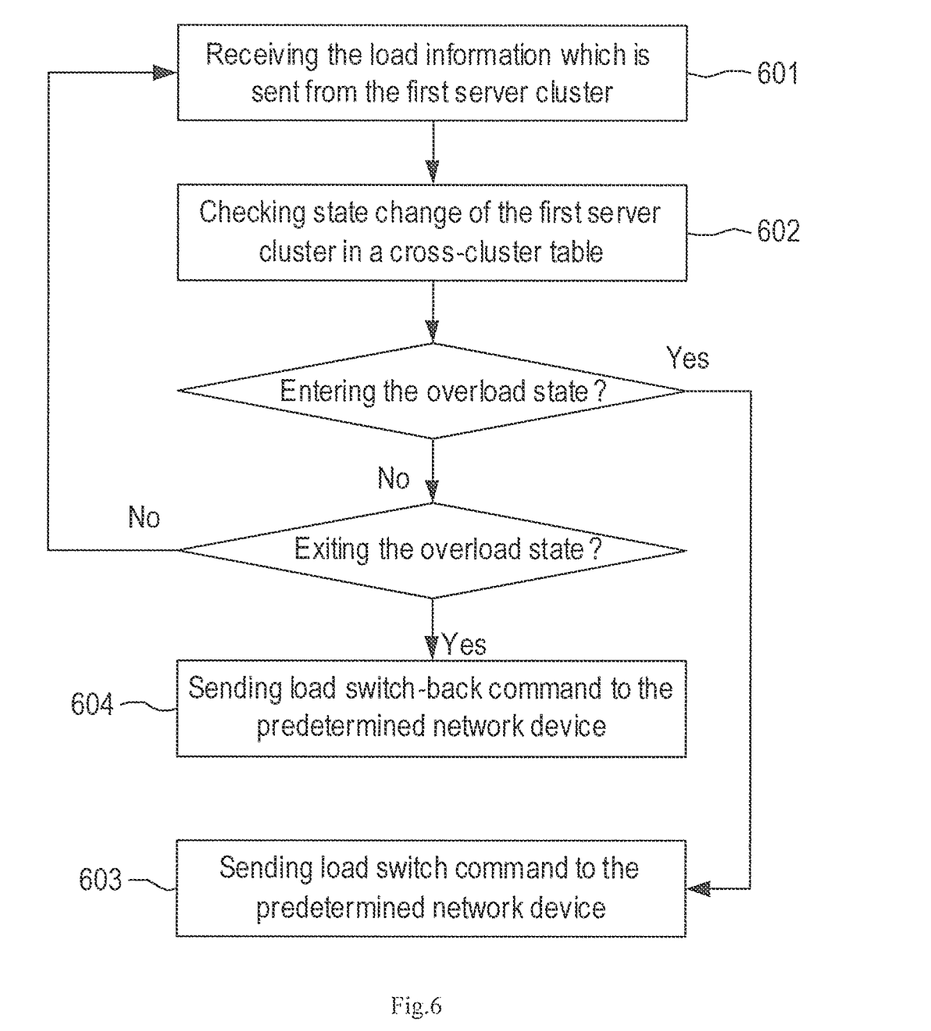
FIG. 6 is an example of flowchart of load balancing across clusters in a SDN controller.

Assuming the switch threshold of the first LBD 121 is 10,000 sessions. When the number of sessions in the first LBD 121 reaches 10,000, then the first server cluster 12 enters to the overload state and the SDN controller 11 executes the aforementioned process to implement the transfer of access. The switch-back threshold is usually less than 10,000 sessions, and assuming the switch-back threshold may be 8,000 sessions. That is, when the number of sessions of the first server cluster 12 is 8,500 and is less than 10,000, the SDN controller 11 will not send the load switch-back command to the network device 151 to avoid frequent switching/switching-back. FIG. 6 is a flowchart of a method for load balancing across cluster in a SDN controller in an example of the present disclosure. Please refer to FIG. 6, in a more detailed example, the processes of the SDN controller 11 are as follows:

In block 601, the SDN controller 11 receives the load information which is sent from the first server cluster 12.

In block 602, the SDN controller 11 checks the state change of the first server cluster in a cross-cluster table.

In block 603, the SDN controller 11 searches the cross-cluster table to find a search target server cluster that is in an idle state which is located in a server cluster group as the first server cluster 12 when the first server cluster 12 is in the overload state. At the same time, the SDN controller 11 sends a load switch command to a predetermined network device which is located in a front path of the first server cluster 12, wherein the load switch command has identification of the source server cluster and identification of a target server cluster. The load switch command may be sent simultaneously with the searching of the cross-cluster table.

In block 604, the SDN controller 11 sends a load switch-back command to the predetermined network device which is located in the front path of the first server cluster 12 when the first server cluster 12 is determined to be exited from the overload state, wherein the load switch-back command has identification of the source server cluster.

From the above description, it can be found that after the predetermined network device, such as the network device 151 or the first LBD 121, transfers the new accesses of the first server cluster 12 to the target server cluster, the number of the sessions of the first server cluster 12 will gradually decrease and approach to the switch-back threshold because the established session of the first server cluster 12 is gradually aging or the users exit session. Once the switch-back threshold is reached, the SDN controller 11 can decide that the first server cluster 12 exits the overloaded state, and can implement the operations for transferring the new consecutive access back to the first server cluster for processing according to the corresponding step in block 604.

Similarly, in order to maintain the consistency of the service, those sessions which are temporarily transferred to the second server cluster 13 can still be processed by the second server cluster 13. The network device 151 can continue to acting as proxy for the sessions which have been listed in the proxy session table. Thus, it allows the packets of those sessions to be processed by the second server cluster 13. In implementation, when the network device 151 acts as proxy for the external host to access the second server cluster 13, the network device 151 saves corresponding proxy session records in the proxy session table. Accordingly, when the network device 151 receives load switch-back command which is sent from the SDN controller, the network device 151 performs a switch-back processing mode for the first server cluster in the load switch-back command. In the switch-back processing mode, the network device performs the following operations. The network device 151 searches the proxy session table based on the session characteristics of the request to query whether there is a matched record when the network device 151 receives the access request of the first server cluster 12, if there is a matched record in the proxy session table, then the network device 151 continues to act as proxy to access the second server cluster 13, otherwise, the network device 151 forwards the request to the first server cluster 12. After a period of time, when each of sessions in the proxy session table is aging or exiting, the proxy session table no longer has any records. At this time, all packets for accessing the first server cluster 12 are processed by the first server cluster 12.

The aforementioned descriptions illustrate the processes of load switching and switching-back. It is worth noting that the switching and switching-back of the load do not occur frequently and the duration is not too long, unless the network is not reasonable deployed by the administrator. Therefore, processing stress of the SDN controller and the predetermined network device 151 is also acceptable.

In the above example, the network device 151 undertakes the role of an auxiliary controller for switching/switching-back in the network. As described in the previous, other network device, such as the first LBD 121, which is located in the front path can also undertake the role of the auxiliary controller. When the first LBD 121 is designated as the predetermined network device, the processing of the first LBD 121 is simpler than that of the network device 151. First, the first LBD 121 does not need the session list table which is sent from the SDN controller 11 in synchronicity because the first LBD 121 itself holds the session list table of the first server cluster 12. Second, the first LBD 121 does not need to download the classification rules of the packet because packets which arrives the first LBD 121 are clearly to access the first server cluster 12. However, using of the network device 151 to process also has its advantages. The reason that the first server cluster entering the overload state may be the result of the first LBD 121 suffered processing capacity bottlenecks. At this moment, if the tasks of the proxy access to the second server cluster 13 are transferred to the first LBD 121, then it may increase the processing load of the first LBD 121. The processing load of the first LBD 121 is not very light at this moment, even if the reason that the first server cluster enters the overload state is not the result of the first LBD 121 suffered processing capacity bottlenecks. To add proxy access to the first LBD 121 may lead the first LBD 121 to encounter processing capacity bottlenecks. In the process of implementation, the administrator can select a reasonable predetermined network device based on the actual situation of the network to perform the processing of access transfer.

The above are only preferred examples of the present disclosure is not intended to limit the invention within the spirit and principles of the present disclosure, any changes made, equivalent replacement, or improvement in the protection of the present disclosure should contain within the scope of the disclosure.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or block, or group of elements, integers or blocks, but not the exclusion of any other element, integer or block, or group of elements, integers or blocks.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for load balancing across clusters, including:
   obtaining, by a software defined network (SDN) controller, load information which is reported by a source server cluster;
   determining based on the load information that the source server cluster is in an overload state;
   in response to determining that the source server cluster is in an overload state, updating the state of the source server cluster in a cross-cluster table of the SDN controller;

searching the cross-cluster table for a target server cluster which is in an idle state and which is located in a server cluster group which the source server cluster belongs to;

sending a load switch command to a predetermined network device which is located in a front path of the source server cluster, wherein the load switch command includes identification of the source server cluster and identification of a target server cluster.

2. The method according to claim 1, further comprising: periodically and synchronously transmitting a current session list from the SDN controller to the predetermined network device.

3. The method according to claim 1, further comprising: sending a load switch-back command to the predetermined network device in response to a determination that the source server cluster has exited from the overload state, wherein the load switch-back command includes identification of the source server cluster.

4. The method according to claim 1, comprising determining that the source service cluster is in the overload state when a load of the first service cluster exceeds a first threshold and determining that the source service cluster has exited the overload state when a load of the source server cluster has dropped below a second threshold; wherein the first threshold is higher than the second threshold.

5. A non-transitory computer readable storage medium on which is stored machine readable instructions that when executed by a processor cause the processor to:

obtain load information reported by a source server cluster;

update the state of the source server cluster in a cross-cluster table in accordance with the load information;

in response to determining that the source server cluster is in an overload state, search the cross-cluster table for a target server cluster that is in an idle state and which is located in a same server cluster group as the source server cluster, and send a load switch command to a predetermined network device which is located in a front path of the source server cluster, wherein the load switch command includes identification of the source server cluster and identification of a target server cluster.

6. The non-transitory computer readable storage medium according to claim 5, wherein the machine readable instructions are further to cause the processor to:

periodically and synchronously transmit a current session list to the predetermined network device in synchronicity in which the current session list is send from the source server cluster to the processor when the processor determines that the source server cluster is in the overload state.

7. The non-transitory computer readable storage medium according to claim 5, wherein the machine readable instructions are further to cause the processor to:

send a load switch-back command to the predetermined network device when the source server cluster exits from the overload state, wherein the load switch-back command includes identification of the source server cluster.

8. The non-transitory computer readable storage medium according to claim 5, wherein the machine readable instructions are further to cause the processor to:

determine that the source service cluster is in the overload state when a load of the first service cluster exceeds a first threshold;

and determine that the source service cluster has exited the overload state when a load of the source server cluster has dropped below a second threshold;

wherein the first threshold is higher than the second threshold.

* * * * *